US008065699B2

(12) United States Patent
Repasi et al.

(10) Patent No.: US 8,065,699 B2
(45) Date of Patent: Nov. 22, 2011

(54) PROVIDING RATING INFORMATION FOR AN EVENT BASED ON USER FEEDBACK

(75) Inventors: Rolf Repasi, Sunrise Beach (AU); Simon Clausen, New South Wales (AU)

(73) Assignee: Symantec Corporation, Mountain View, CA (US)

( * ) Notice: Subject to any disclaimer, the term of this patent is extended or adjusted under 35 U.S.C. 154(b) by 464 days.

(21) Appl. No.: 11/818,772

(22) Filed: Jun. 15, 2007

(65) Prior Publication Data

US 2008/0005761 A1 Jan. 3, 2008

Related U.S. Application Data

(60) Provisional application No. 60/815,103, filed on Jun. 20, 2006.

(51) Int. Cl.
*H04H 60/33* (2008.01)
*H04N 5/445* (2011.01)
*H04N 7/173* (2011.01)

(52) U.S. Cl. ............................. 725/13; 725/40; 725/110

(58) Field of Classification Search ................ 725/9, 13, 725/16

See application file for complete search history.

(56) References Cited

U.S. PATENT DOCUMENTS

| | | | | |
|---|---|---|---|---|
| 7,664,669 | B1 * | 2/2010 | Adams et al. | 705/10 |
| 2002/0053077 | A1 * | 5/2002 | Shah-Nazaroff et al. | 725/13 |
| 2006/0026593 | A1 * | 2/2006 | Canning et al. | 718/100 |
| 2007/0157221 | A1 * | 7/2007 | Ou et al. | 725/10 |
| 2007/0204287 | A1 * | 8/2007 | Conradt et al. | 725/28 |
| 2007/0256093 | A1 * | 11/2007 | Hiler | 725/28 |

* cited by examiner

*Primary Examiner* — Dominic D Saltarelli
*Assistant Examiner* — Chris Parry
(74) *Attorney, Agent, or Firm* — Holland & Hart LLP

(57) ABSTRACT

A method of (and associated system and computer program product for) providing a rating for an event. A user submits feedback data using an interface provided on a user terminal, the feedback data related to the event. A user submitting feedback data may have a member user weighting, preferably obtained from one or more other member users, or may be initially allocated as a default weighting. The rating for the event is determined at least partially based on the feedback data, and may also be based on the member user weighting of the member user who submitted the feedback data. The rating may be determined or adjusted by feedback data and respective member user weightings received from other member users. An event may be a broadcast, concert, exhibition, tour, show, movie, competition, party, and/or function.

18 Claims, 7 Drawing Sheets

PROVIDING RATING INFORMATION FOR AN EVENT BASED ON USER FEEDBACK

This application claims the benefit of priority from Provisional Application Ser. No. 60/815,103, filed on Jun. 20, 2006, which is hereby incorporated by reference in its entirety.

TECHNICAL FIELD

The present invention generally relates to rating or ranking of an event, for example a broadcast, concert, exhibition, tour, show, movie, competition or the like, and more particularly to a method, system and/or computer program product for providing a rating or ranking for an event, obtained from a plurality of users, for example audience members, viewers, listeners, etc.

BACKGROUND ART

Presently, broadcasters have no readily accessible means of determining a level of satisfaction a particular event is providing an audience. For example, in the field of television ratings, Nielsen Media Research has become the de facto national measurement service for the television industry in the United States and Canada. Nielson measures the number of people watching television shows and makes its data available to television and cable networks, advertisers and the media. Nielsen uses statistical sampling to rate the shows by creating a sample audience and then counting how many people in the sample audience view each program. Nielsen then extrapolates from the sample and estimates the number of viewers in the entire population watching a show. Devices are installed in the homes of sample viewers and track when TV sets are on and to which channels they are tuned, the device can gather and transmit this information to Nielson's central computer. This data can be extremely valuable, with advertisers paying for commercials using rates that are based on the data. Programmers may also use this data to decide which shows to keep and which to cancel.

However, this approach has several problems, including as non-limiting examples: the system/method cannot be generally applied or used for any type of event; the system/method is not interactive; not all members of an audience have an opportunity to express their preferences; the sample population may not be adequately representative; large sample populations can become expensive to monitor; members of the audience may not be satisfied with all sections of a particular program which is not captured in the data; traditional ratings systems cannot determine which parts of a program an audience prefers, and which parts they do not.

A computer system may be a type of processing system, terminal, computer or computerized device, personal computer (PC), mobile or cellular telephone, mobile data terminal, portable computer, Personal Digital Assistant (PDA), pager or any other similar type of device. The capability of such a computer system to process, request and/or receive information or data can be provided by software, hardware and/or firmware. A computer system may include or be associated with other devices, for example a local data storage device such as a hard disk drive or solid state drive. A computer with a rootkit is sometimes called a rooted computer.

An information source can include a server, or any type of terminal, that may be associated with one or more storage devices that are able to store information or data, for example in one or more databases residing on a storage device. The exchange of information (i.e., the request and/or receipt of information or data) between a terminal and an information source, or other terminal(s), is facilitated by a communication means. The communication means can be realised by physical cables, for example a metallic cable such as a telephone line, semi-conducting cables, electromagnetic signals, for example radio-frequency signals or infra-red signals, optical fibre cables, satellite links or any other such medium or combination thereof connected to a network infrastructure.

There is a need for a method, system and/or computer program product for providing a rating or ranking for an event which addresses or at least ameliorates one or more problems inherent in the prior art.

The reference in this specification to any prior publication (or information derived from the prior publication), or to any matter which is known, is not, and should not be taken as an acknowledgment or admission or any form of suggestion that the prior publication (or information derived from the prior publication) or known matter forms part of the common general knowledge in the field of endeavour to which this specification relates.

DISCLOSURE OF INVENTION

According to a first aspect, there is provided a method of providing a rating for an event, the rating obtained from one or more users being members of the audience of the event, the method including: receiving feedback data submitted by a user via an interface provided on a user terminal, the feedback data relating to the event; and, determining the rating for the event at least partially based on the feedback data.

According to a second aspect, there is provided a system for providing a rating for an event, the rating obtained from one or more users, a user submitting feedback data using an interface provided on a user terminal, the feedback data relating to the event, the system including: a processor to determine the rating for the event at least partially based on the feedback data; and a database to store the rating.

According to a third aspect, there is provided a computer program product, executable on a processing system, for use in providing a rating for an event, the rating obtained from one or more member users, the computer program product providing an interface configured to enable a member user to submit feedback data from a member user terminal, the feedback data relating to the event, the member user having a member user weighting, and wherein the determination of the rating for the event is at least partially based on the feedback data and the member user weighting.

According to various non-limiting example forms: the user is a member user having a member user weighting; the user is a member user belonging to at least one sub-group of member users; determining the rating for the event is based on a plurality of feedback data and a plurality of respective member user weightings from a plurality of member users; the feedback data is submitted by the user while the user is viewing, listening to or participating in the event; an indication of a plurality of ratings from a plurality of users is provided to a broadcaster of the event; the event is altered during progress in response to the indication of a plurality of ratings; and/or the indication of a plurality of ratings is a 'satisfaction rating' of at least part of the audience of the event.

In a particular example form, the rating or quality of an event can be determined by feedback from users, e.g. a community of users. Each member of this community (i.e. audience) has an interface to a database and may submit substantially instant feedback data regarding the rating or quality of the current event, eg. broadcast, of which they are viewing/ listening. A broadcaster, or the like, is then able to view and gauge a current 'satisfaction rating' of the audience in real-time. The current satisfaction rating may be displayed to the broadcaster as: text data; graphics; charts; animations; and/or a combination of such. This allows the broadcaster to adjust/customize the event, for example the content of TV programming, in a way that attempts to ensure most of the audience remains satisfied. For example, programming which receives a large amount of negative feedback may be reduced from circulation or removed entirely and replaced with programming which is more favored by the audience.

In accordance with a specific optional embodiment, provided by way of example only, the feedback data can be submitted by a user while the user is, for example, viewing, listening to, or participating in the event. Thus, in a particular form, feedback data can be submitted in real-time by a user whilst an event is occurring. Alternatively, feedback data can be submitted after an event, or at least part of the event, is completed or concluded. According to yet a further alternate embodiment, in cases where a user is providing or intends to provide feedback data using a terminal which does not have continuous access to the feedback service (eg. PDA/Mobile phone with GPRS), feedback may be queued locally and transmitted when access to the feedback service becomes available. The amount of queued feedback data and its lifespan may be determined by a "policy" or set of rules enforced on the feedback service.

Optionally, but not necessarily, a selection of events are ranked according to the rating of each of the selected events.

In particular forms, an event is, for example, a broadcast, concert, exhibition, tour, show, movie, competition, party, function or the like. An event may be something that a person physically attends, views or watches, listens to, interacts with, etc.

Optionally, but not necessarily, only a member user can submit feedback data and a member user weighting is allocated, provided, calculated or obtained for the member user, the member user weighting determined by one or more other member users having rated previous feedback data from the member user in respect of at least one other event, or by the member user being allocated or provided with a weighting by an administrator or the like.

In accordance with other specific optional embodiments, provided by way of example only: a member user weighting is dynamic and can change when one or more other member users rate new feedback data submitted by the member user; an organizer, distributor, provider, broadcaster, or the like, of the event is provided with the rating of the event after the rating has been determined; and/or a selection of events is provided to the organizer, distributor, provider, broadcaster, or the like, as a ranked list based on ratings.

Optionally, but not necessarily, the interface on a user terminal is one or more of the group of: at least one feedback data submission tool or program; at least one feedback data submission tool or program embedded in another software product; a mobile or cellular telephone application; a PDA application; a web browser; a web browser plug-in; a media player program; a media player program plug-in; a program embedded in a set-top box or a Personal Video Recorder (PVR); and/or, at least one feedback data submission tool provided as a pop-up window, for example activated by clicking an icon on a user interface or web-page.

BRIEF DESCRIPTION OF FIGURES

An example embodiment of the present invention should become apparent from the following description, which is given by way of example only, of a preferred but non-limiting embodiment, described in connection with the accompanying figures.

MODES FOR CARRYING OUT THE INVENTION

Figure 1:
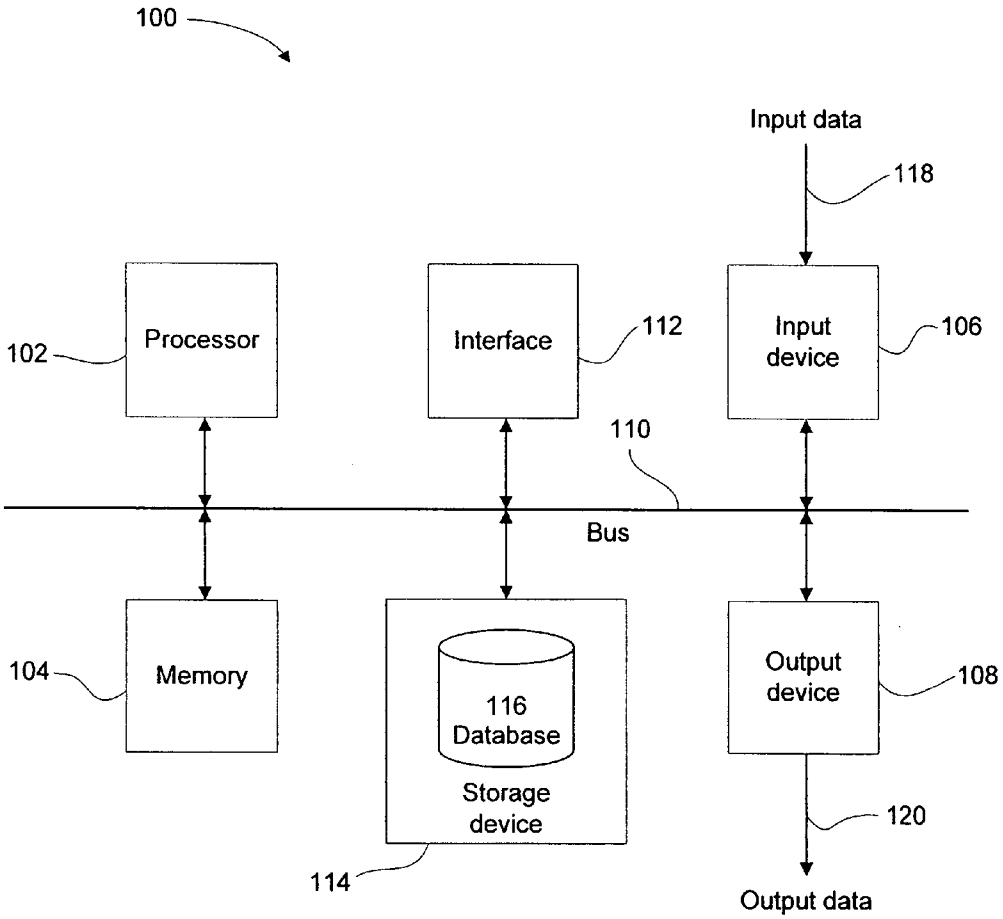
FIG. 1 illustrates an example functional block diagram of a processing system that can be utilized to embody or give effect to a particular embodiment.

The following modes, given by way of example only, are described in order to provide a more precise understanding of the subject matter of a preferred embodiment or embodiments.

In the figures, incorporated to illustrate features of an example embodiment, like reference numerals are used to identify like parts throughout the figures.

Processing System

A particular embodiment of a user terminal can be realised using a processing system, an example of which is shown in FIG. 1. In particular, the processing system 100 generally includes at least one processor 102, or processing unit or plurality of processors, memory 104, at least one input device 106 and at least one output device 108, coupled together via a bus or group of buses 110. In certain embodiments, input device 106 and output device 108 could be the same device. An interface 112 can also be provided for coupling the processing system 100 to one or more peripheral devices, for example interface 112 could be a PCI card or PC card. At least one storage device 114 which houses at least one local database 116 can also be provided. The memory 104 can be any form of memory device, for example, volatile or non-volatile memory, solid state storage devices, magnetic devices, etc. The processor 102 could include more than one distinct processing device, for example to handle different functions within the processing system 100.

Input device 106 receives input data 118 and can include, for example, a keyboard, a pointer device such as a pen-like device or a mouse, audio receiving device for voice controlled activation such as a microphone, data receiver or antenna such as a modem or wireless data adaptor, data acquisition card, etc. Input data 118 could come from different sources, for example keyboard instructions in conjunction with data received via a network. Output device 108 produces or generates output data 120 and can include, for example, a display device or monitor in which case output data 120 is visual, a printer in which case output data 120 is printed, a port, for example a USB port, a peripheral component adaptor, a data transmitter or antenna such as a modem or network adaptor, etc. Output data 120 could be distinct and derived from different output devices, for example a visual display on a monitor in conjunction with data transmitted to a network. A user could view data output, or an interpretation of the data output, on, for example, a monitor or using a printer. The storage device 114 can be any form of data or information storage means, for example, volatile or non-volatile memory, solid state storage devices, magnetic devices, etc.

In use, processing system 100 is adapted to allow data or information to he stored in and/or retrieved from, via wired or wireless communication means, the at least one database 116. Interface 112 may allow wired and/or wireless communication between the processing unit 102 and peripheral components that may serve a specialized purpose. The processor 102 may receive instructions as input data 118 via input device 106 and can display processed results or other output to a user by utilizing output device 108. More than one input device 106 and/or output device 108 can be provided. It should be appreciated that processing system 100 may be any form of terminal, server, specialized hardware, computer, computer system or computerized device, personal computer (PC), mobile or cellular telephone, mobile data terminal, portable computer, Personal Digital Assistant (PDA), pager or any other similar type of device.

Output data 120 can take the form of feedback data provided by the user in response to viewing or participating in an event.

Overview

The perceived rating of an event by users, for example audience members, can be determined by feedback, in the form of feedback data, from the users. Each user is provided with or has access to an interface to a server application which can be in further communication with a server-based database, for example the interface is provided as an application, applet, web-page or the like, on a user terminal that may be processing system 100. Each user may submit feedback data via a software interface regarding the perceived quality of the event which the user is currently viewing or participating, or has viewed or participated. Feedback data can be submitted substantially instantaneously from the user terminal over a network to be received by a server application and optionally also stored in a database.

According to another embodiment, only feedback data from a user who is a member user is received, and member users are ranked by other member users in a member user community. This may be based on the perceived worthiness of previous feedback data submitted by a member user. Therefore, a first member user who has received more votes, or a higher rating in some form, from other member users rating the first member user's feedback as useful, or is attributed a higher priority from an administrator or the like, can receive a higher member user ranking, that is, a greater member user weighting. This in turn means the opinion of such a member user is appropriately weighted to factor into the overall quality rating or subsequent ranking of an event for which the member user has submitted feedback data. Conversely, if a member user receives lower ratings, negative votes or the like, based on the member user's past feedback, this can have the opposite effect whereby the member user's future feedback for an event is considered less worthy and is attributed appropriately less weighting.

In the embodiment utilizing members users, the member user community can be formed from a variety of sources. For example, a member user could be selected from one or more of the following example criteria:

i. a user who subscribes to become a member user;
ii. by invitation from an organizer or administrator;
iii. by random selection;
iv. a particular category of user;
v. a user who is a customer or subscriber of a particular organization or service; or,
vi. as a sample of a wider population.

When different events are each attributed an overall rating, preferably by a plurality of users, based on all received feedback data, the different events can be ranked against each other. Different events in a similar category, for example television shows broadcast at a particular time, could be ranked based on the overall rating for each of the television shows. The rating or ranking for an individual event can be provided to an entity responsible for or associated with the event, for example a broadcaster of a broadcast (free-to-air, Internet, cable, etc.), a network responsible for a television or cable program, an organization responsible for a concert, exhibition, tour, show, etc., distributor of a movie, or a wide range of other types of responsible entities or events.

Rating Submission by Users

Figure 2:
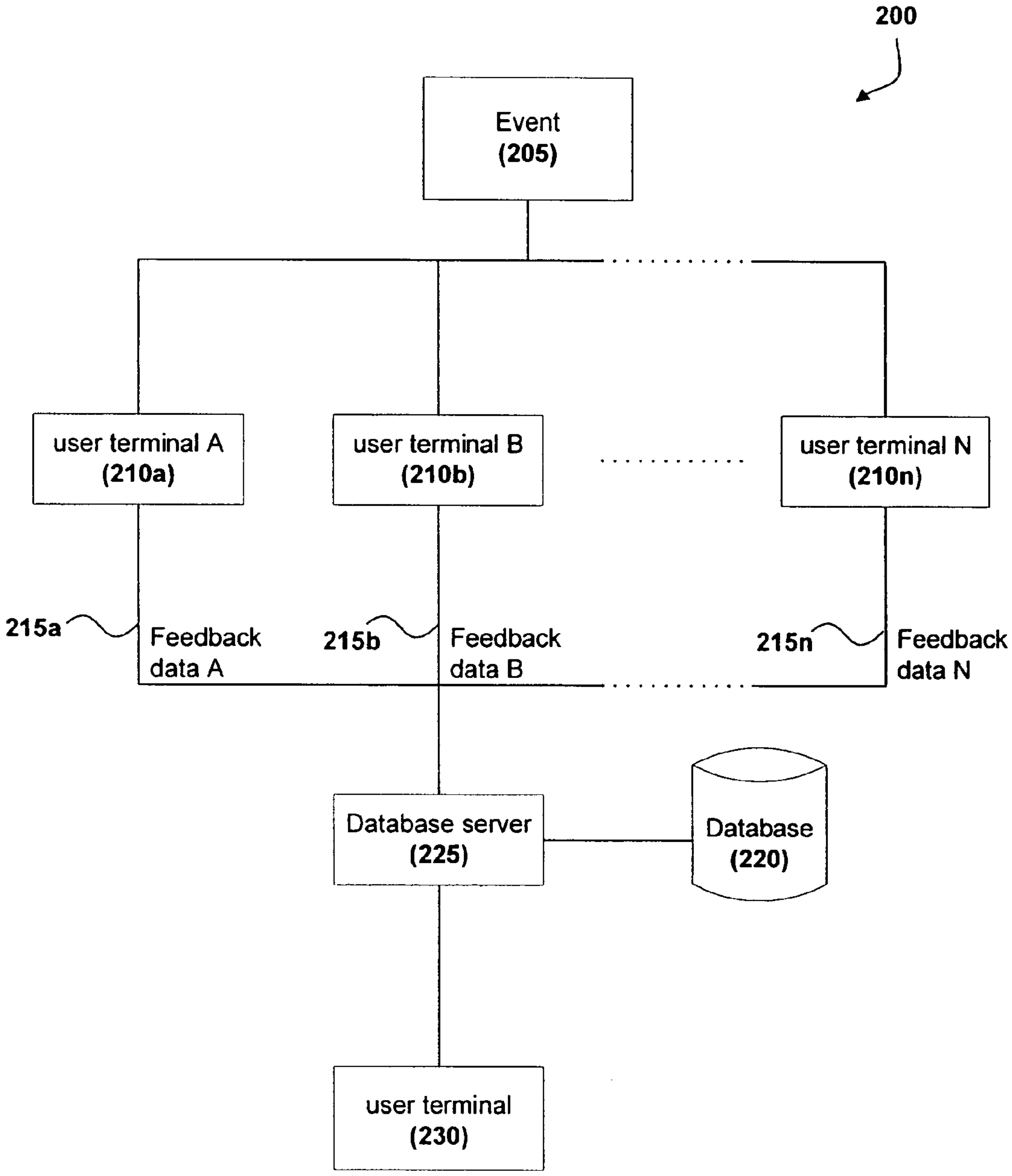
FIG. 2 illustrates an block diagram of an example system providing a particular embodiment.

Referring to FIG. 2, there is illustrated a block diagram of an example system 200. In system 200 an event 205 is being rated by users A, B, . . . N. Each user A, B, . . . N is operating user terminal A 210*a*, user terminal B 210*b*, . . . user terminal N 210*n*, respectively. A user may be viewing, or have viewed, event 205, or event 205 could have been viewed locally on, or may have been accessed remotely by, user terminal A, user terminal B, . . . user terminal N. When user A desires to submit a rating for event 205, user A causes user terminal A 210*a* to submit feedback data 215*a* to database 220 via database server 225, which is typically running a server application to receive and store feedback data. Likewise, when user B desires to rate event 205, user B causes user terminal B 210*b* to submit feedback data 215*b* to database 220 via database server 225. This process is repeated, by each user who desires to submit a rating for event 205. In one example, a time deadline may be imposed on users by when any feedback data must be received if it is to be used to rate event 205.

Submission of feedback data 215*a* to database 220 is substantially instantaneous when user A effects submission of feedback data 215*a* via user terminal A 210*a*. Feedback data 215*a* can be transmitted from user terminal A 210*a* to database server 225 via a network (not illustrated). Other users, for example user B, may submit feedback data at a different time to user A, and/or only a certain time window may be provided for all users to submit feedback data.

Alternatively, in cases where a user is providing or intends to provide feedback data using a terminal which does not have continuous access to the feedback service (eg. PDA/Mobile phone with GPRS), feedback may be queued locally and transmitted when access to the feedback service becomes available, which may be periodically or on as "as required" basis. The amount of queued feedback data and its lifespan may be determined by a "policy" or set of rules enforced on the feedback service, for example at the server.

Feedback data 215*a*, 215*b*, 215*n* is received in database 220 so as to determine an overall rating for event 205 based on the individual ratings from users, which are embodied in the feedback data.

In another aspect, a user, for example a potential future viewer or participant of event 205, can access information in database 220 via a front end provided by database server 225 by using user terminal 230. This allows the potential viewer/participant to view a rating/ranking for event 205 where ratings have been previously submitted by one or more users A, B, . . . N rating event 205.

Rating Submission by Member Users

In an alternate embodiment, users A, B, . . . N are member users, and only feedback data from member users is received to calculate an overall rating for event 205. In this form, member user weightings are also either received by or stored in database 220 so that the member user weightings can be factored into the overall rating of event 205.

In the case where users A, B, . . . N are member users, a non-member user, for example a potential future viewer or participant of event 205, can access information in database 220 via a front end provided by database server 225 by using user terminal 230, which in this case is a non-member user terminal 230. This allows the potential viewer/participant to view a rating/ranking for event 205 where ratings have been submitted by one or more member users A, B, . . . N rating event 205, and furthermore where the contribution of each member user A, B, . . . N themselves is weighted.

Figure 3:
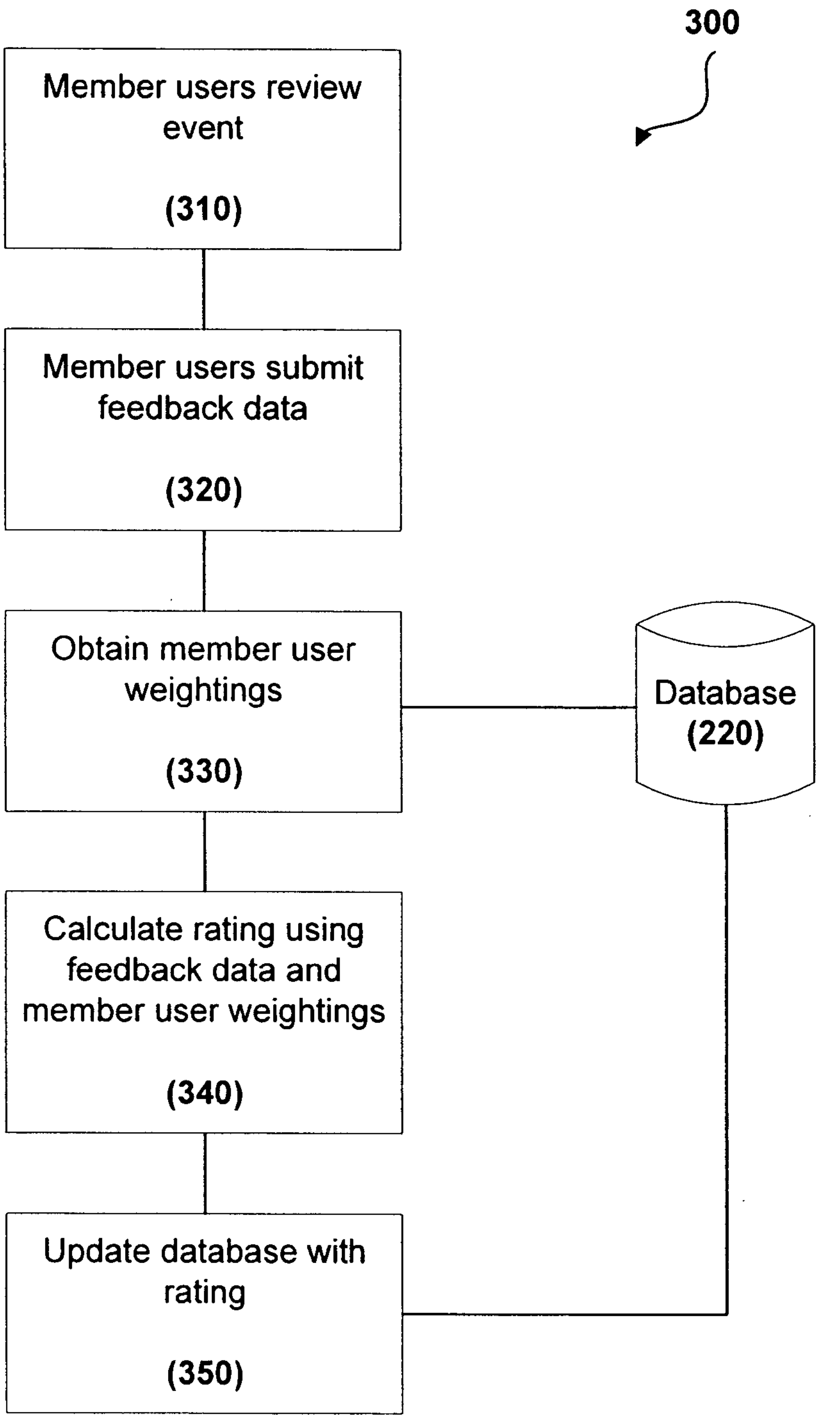
FIG. 3 illustrates steps of a method providing a particular example embodiment.

Referring to FIG. 3, there is illustrated a method 300 of providing a rating for an event, the rating obtained from a plurality of member users. At step 310 one or more member users reviews the event. At step 320, one or more member users each submit feedback data using an interface provided on each member user's terminal, the feedback data relating to the event. At step 330, a member user weighting is obtained for each member user who has submitted feedback. At step 340, a rating for the event is calculated using the feedback data submitted by member users and also using member user weightings for each of the member users that submitted feedback data. At step 350, database 220 is updated with the calculated overall rating. The calculated rating is preferably dynamic and can be updated each time a different member user submits feedback data to database 220.

Figure 4:
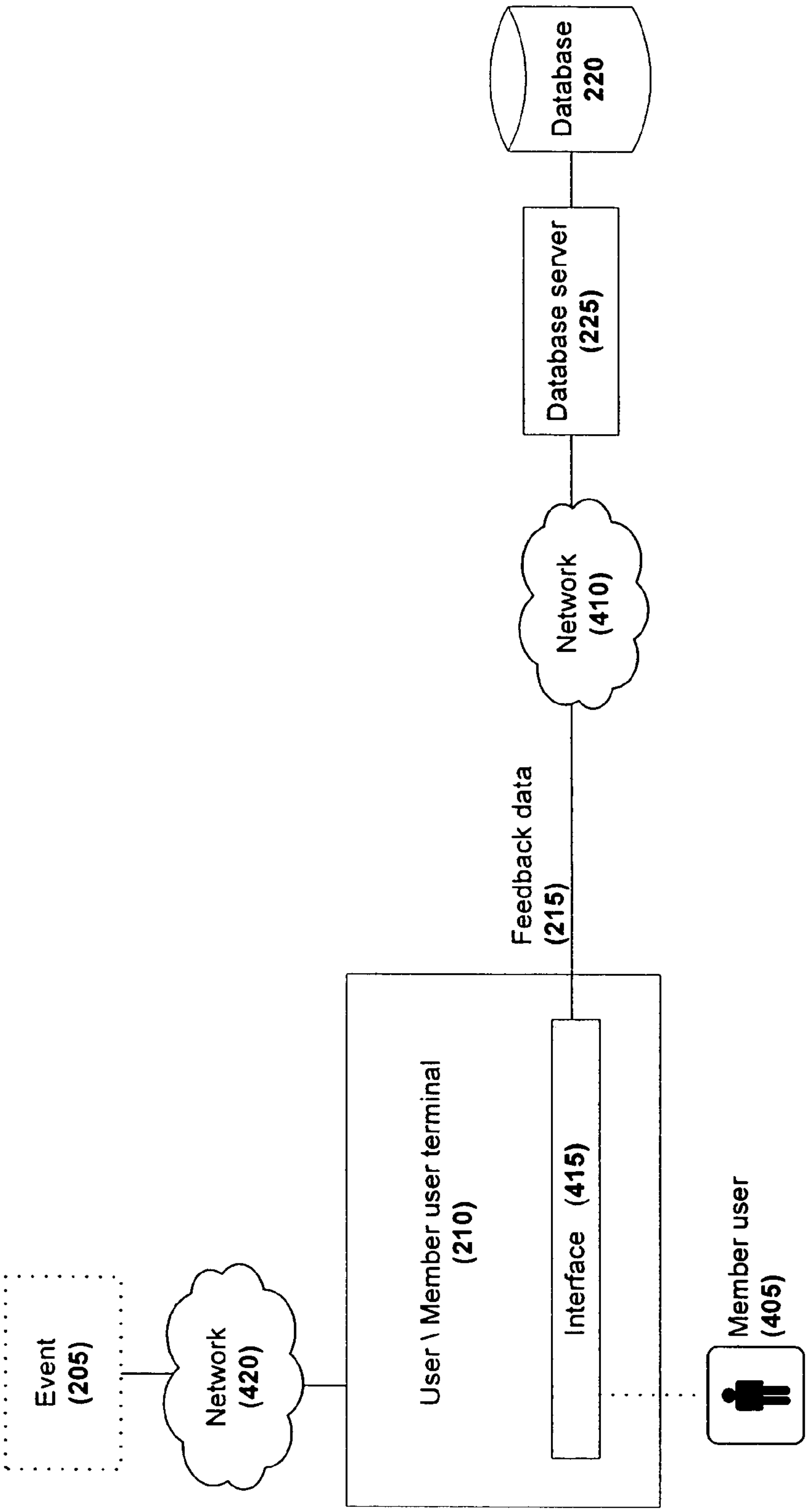
FIG. 4 illustrates example features of a user/member user terminal.

Referring to FIG. 4, further details of a particular embodiment are illustrated. Member user 405 operates member user terminal 210. Member user 405 utilises interface 415 to rate event 205 and causes feedback data 215 to be transmitted over network 410 to database 220 via database server 225. Network 410 may be the same as network 420.

Figure 5:
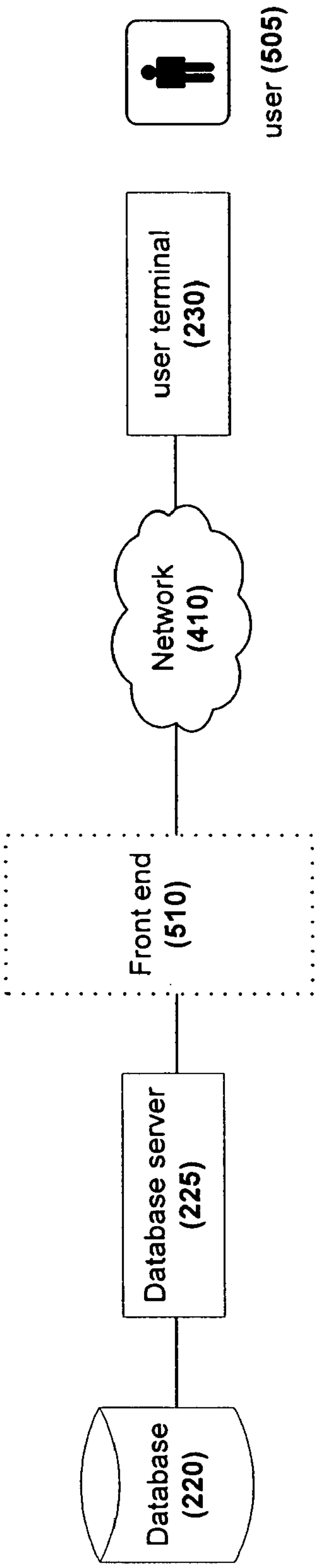
FIG. 5 illustrates example features of a front end utilised by a non-member user.

Referring to FIG. 5, in the case where feedback data is only received from member users, non-member user 505, for example a potential viewer/participant of event 205, or an event organizer, administrator, etc., can request rating or ranking information related to event 205 from database 220. This is achieved by non-member user 505 operating user terminal 230 to interact with front end 510 of database 220/database server 225 via network 410.

Member users can be selected according to a wide variety of criteria, and may or may not be, for example, professional critics, reviewers or journalists. Member users have access to database 220. Access to database 220 is via client-side software, for example a desktop application which preferably runs continuously on the member user's terminal.

Event Alteration

As another example, an organizer, administrator, producer, etc., of event 205 might access database 220 whilst event 205 is occurring, or shortly after event 205 has occurred, to view current, final or progressive rating or ranking information, from either users and/or member users. Thus, in one form, if event 205 is not finalized or completed, and can be adapted or altered, an organizer of event 205 might adapt or alter event 205, or even cancel event 205, in response to live or real-time rating or ranking information received from either users and/or member users.

User Sub-Groups

Separate rating information could also be received from users and member users, thereby allowing an analysis of the ratings from different users, e.g. general users or member users that may be from a specific category, e.g. a particular age group, geographic location, etc. Furthermore, different ratings could be calculated from different sub-groups of users and/or member users. For example, where member users are required to subscribe and submit information, one member user group could be from past viewers/participants and one member user group could be formed of new viewers/participants. A wide variety of different sub-group criteria is possible, for example, but not limited to, age, sex, location, socioeconomic status, vocation, etc.

User/Member User Interface

Feedback data 215 can be submitted by a user or member user simultaneously while event 205 is being viewed, for example even if event 205 is be being viewed on user terminal 210. This is achieved by use of an interface 415.

For example, interface 415 on user terminal 210 provides at least one feedback data submission tool. The at least one feedback data submission tool provided by interface 415 could involve a user/member user selecting a number of rating icons, for example rating "stars", selecting a sliding bar scale, manually inputting a rating, for example a percentage, or any other number of means for providing a rating for an event.

The submission tool may be provided in a separate program window. Alternatively, the feedback data submission tool could be embedded in a title bar of a software application when used on user terminal 210. Also alternatively, the feedback data submission tool could be provided as a pop-up window activated by user/member user clicking an icon, which may or may not be directly associated with a software application, web browser or web site.

Interface 415 can also provide more than one form of feedback data submission tool, for example a "star" or icon based rating system either individually with or in combination with other types of rating systems, such as percentage rating. Ratings can be submitted for various aspects of event 205. That is, feedback data 215 may include a plurality of distinct ratings provided by the user/member user in relation to different aspects of event 205, for example, overall quality, interest, specific characters or people, time slot, length, etc.

When feedback data 215 is transmitted to database 220 by a member user, data indicating or identifying the member user is also preferably provided. This allows feedback data 215 to be linked to the member user. Member user 405 is provided with a member user weighting that has been determined by one or more member users having previously rated earlier feedback data submitted by member user 405 in respect of other events. However, it should be noted that it is possible that a member user weighting could be calculated based on feedback or other factors not related to earlier submitted ratings, for example a member user weighting may be affected by the member user's ratings of other products/services, eg. web sites not related to the event or general peer reviews. This historical data allows a member user weighting to be determined that can then be associated with new feedback data 215 submitted by the member user in respect of event 205. A member user weighting is preferably dynamic and can change when one or more other member users rate new feedback data submitted by member user 405. If a member user does not yet have an associated member user weighting, for example if the member user is new, a default member user weighting can be allocated to the member user. For example the default member user weighting may be 75%, which could be a base weighting which is amended when other member users rate the member user, or could be replaced entirely when other member users rate the member user.

In a particular form, when member users are integrated into the system, front end 510 is specifically adapted to allow a non-member user 505 access to the overall rating of event 205 stored in database 220. In one form, only member users can see individual ratings by other member users to enable member users to rate each others feedback data to thereby determine each respective member user's weighting. Non-member user 505 does not contribute to rating events or, optionally but not necessarily, a member user weighting, which significantly reduces the problem of biased rating of events.

Non-member user 505, or an organizer, administrator, etc., may also access front end 510 to obtain a ranking of a selection of events, with the ranking based on the overall rating for each of the events. For example, front end interface 510 may be part of a search engine which queries database 220 and is provided with rating and/or ranking information for display to non-member user 505.

Interface 415 on user/member user terminal 210 thus provides a computer program product for use in providing a rating for event 205.

Client-side software provides interface 415 that may provide, by way of example, the following: an "always on top" window containing one or more slide bars; an "always on top" window containing one or more sets of 5 stars which are clickable; a widget embedded in the currently running applications title bar, i.e. software product, containing one or more slide bars; and/or one or more sets of 5 stars which are clickable; and/or a widget embedded in the currently running applications title bar which when clicked by the member user pops up a menu of available rating/ranking options.

Search Results

Figure 6:
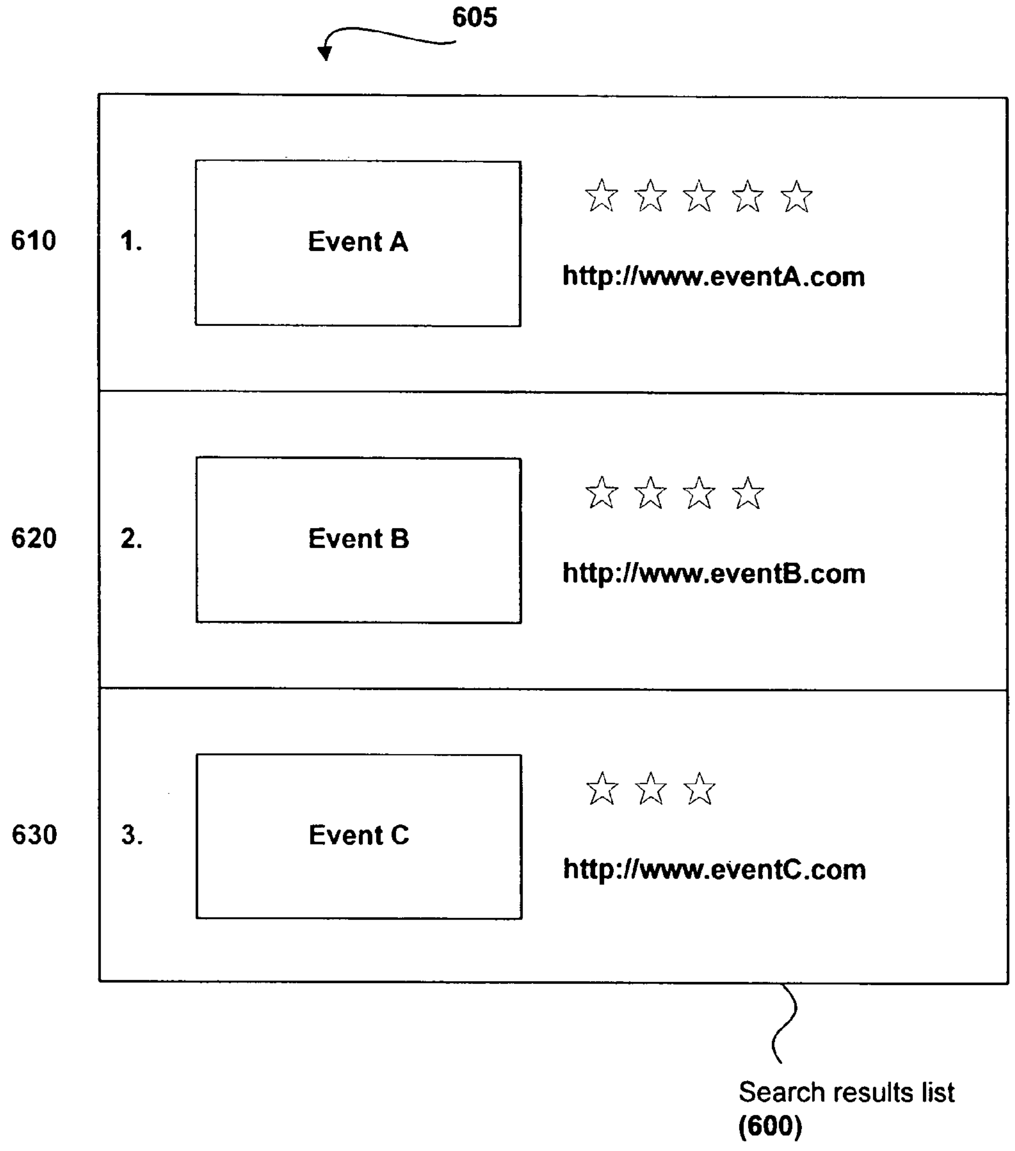
FIG. 6 illustrates an example search results list of selected events.

Referring to FIG. 6, there is illustrated an example search results list 600 that could be obtained using a front end to database 220. For example, if a user submits a search for sporting events, a selection of sporting events 605 can be displayed. Results are ranked: event A in row 610 has been provided with a rating of 5 stars, and is listed above event B, shown in row 620 and provided with a rating of 4 stars, which in turn is displayed above event C, shown in row 630 and provided with a rating of 3 stars. This facilitates ready identification by a user that event A presented in row 610 is rated most highly of the displayed events by other users/member users.

Other Aspects

Database 220 may contain provisions for preventing abuse of the service from users/member users, for example preventing submissions of multiple ratings for a single event from a single user/member user. Users/member users who repeatedly report ratings outside of a standard deviation for a particular event could be temporarily or permanently barred from being a user/member user.

Database server 225, by querying information in database 220, can determine the overall rating or ranking of an event based on a statistical analysis of rating metrics and user/member user ratings.

Users/member users can also be provided with the ability to query database 220 to determine the quality of an event which they intend to view/participate. The query may be performed automatically by client-side software, may be performed on downloading of certain installation files, or may be performed when a link is detected in the member user's web browser, irrespective of whether that link has been clicked or not.

Query results may be displayed to a user/member user when: the user/member user is navigating a web page or web site; or relating to software available from a new web page or web site about to be navigated to by the user/member user.

Front end 510 to database 220 may also form part of a software recommendation service which alerts users/member users on the highest ranking events from user defined categories. For example, alerts may be in the form of, but not limited to: notifications from a software application; e-mail notifications; SMS notifications; and/or WAP push notifications. Where the front end is a desktop application, the application may semi-automatically install links or software on a user's terminal.

Interface 415 or front end 510 may be implemented separately, or in combination with currently known solutions as a software package and/or online service. Interface 415 or front end 510 may be accessed by any form of suitable terminal, for example a PC, PDA, cellular or mobile telephone, etc. In a particular embodiment, client-side software/interface, may operate on Microsoft Windows and server-side software may utilise Linux, however, embodiments of the present invention can be applied to any modem operating system or combination of modem operating systems.

Example Rating Calculation for Feedback From Member Users

A particular, but non-limiting example of determining a rating of an event, based on ratings from member users is now provided. Assume there are three member users A, B and C. Also assume that based on previous ratings of events member user A has been rated an average of 3.5 out of 5 by member users B and C. Also assume that based on previous events member user B has a rating of 4 out of 5 and member user C a rating of 4.5 out of 5, as an averaged weighting by their fellow member users. This provides member user weightings of 0.292 (3.5/12), 0.333 (4/12) and 0.375 (4.5/12) for member users A, B and C, respectively, out of the total available weighting of 12 (3.5+4+4.5) available for all member users A, B and C that are rating a new event. Assuming member users A, B and C rate the new event as 4/5, 3/5 and 5/5, respectively, then the average weighted rating for the new event can be said to be 4.042 (calculated as $4\times0.292+3\times0.333+5\times0.375$). Thus, the rating for the new event may be approximated to be 4 out of 5 which has also taken into account member user weightings by other member users.

Further Example Embodiment

Figure 7:
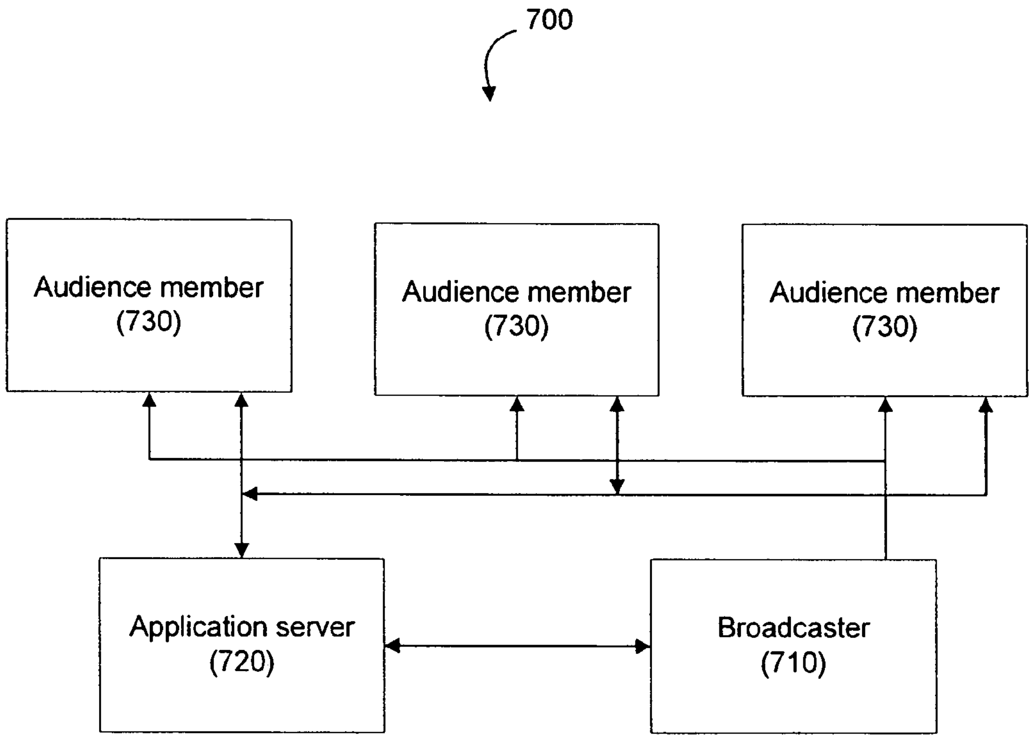
FIG. 7 illustrates a further example system for audience member feedback.

The following example provides a discussion of a particular embodiment. The example is intended to be merely illustrative and not limiting to the scope of the present invention. Referring to FIG. 7, there is illustrated a system 700 providing a means for audience members to rate a program, being a specific example of an event. Broadcaster 710 broadcasts programs in the usual way, which may include, Internet streaming, Over-the-air (Analogue or Digital), Over cable, etc. Audience members 730 have 'receive only' access to the broadcast program. This means that communication is one-way from the broadcaster 710 to the audience 730.

The broadcaster 710 also operates an application server 720 which can perform the following functions:

A. Transmit currently broadcast program's metadata to the broadcaster 710, this may include:

i. Program name;

ii. Program length;

iii. Program genre;

iv. Program creation date/time;

v. Broadcaster name;

vi. Overall satisfaction of other audience members 730; and/or vii. Other miscellaneous information.

B. The application server 720 allows the audience members 730 to report a current level of satisfaction, i.e. rating, with the program, or part thereof, they are viewing or listening to.

C. An audience member 730 may report to the application server 720 via, for example:

i. Internet connection; and/or ii. RF (over the air), eg: Microwave, Satellite.

D. The broadcaster 710 may report to the application server by utilizing, either:

i. Computer software, including:

1. Web browser;
2. Web browser plug-in;
3. Media player;
4. Media player plug-in;
5. Desktop widget;
6. Stand alone application;

ii. Embedded software, running on a network connected:

1. Set top box;
2. PVR;
3. Mobile device, such as PDA or mobile phone;

E. An audience member 730 may report their level of satisfaction to the application server by utilizing methods described in step D, based on, for example:

i. A sliding scale, i.e.: 1-100;

ii. A sliding scale, i.e.: 1-5 stars; and/or iii. A Boolean scale, i.e.: "thumbs up" or "thumbs down".

The application server 720 may contain provisions for prevention of abuse of the service from audience members 730. For example, audience members 730 who repeatedly report a rating/quality/satisfaction level outside of a standard deviation for a particular event/program may be temporarily or permanently banned from the service/system.

The application server 720 can determine an overall satisfaction rating for a currently broadcast program, and make the data available to the broadcaster 710. A rating can be based on statistical analysis of metrics obtained via step E.

The application server 720 may also recommend other events/broadcasts/programs which may be of interest for a particular audience member 730 based on past levels of satisfaction that a particular audience member has submitted.

Preferably, the application server 720 also:

a. Keeps a record of each individual audience member 730;

b. Records all feedback data provided by audience members 730 in a historical database;

c. Groups audience members with similar interests/levels of satisfaction/rating; and/or, d. Utilizes data gathered about these groups of audience members when recommending other broadcast programs to members of the group.

It should be noted that this type of calculation is provided as an example only and many other methods of calculating a weighted, or non-weighted, rating could be utilised. Member users A, B and C could then assess what each other member user submitted as an individual rating for the new event and update their rating of the other member users based on their perception of the accuracy of the other members individual ratings. Thus, each member user weighting could be different in the calculation of the overall rating for another event.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although a preferred embodiment has been described in detail, it should be understood that various changes, substitutions, and alterations can be made by one of ordinary skill in the art without departing from the scope of the present invention.

Aspects of the present invention may take the form of an entirely hardware embodiment, an entirely software embodiment, or an embodiment combining software and hardware aspects.

The invention claimed is:

1. A computer-implemented method of providing a rating for an event, the rating obtained from one or more member users being members of an audience of the event, the method including:

selecting, at a database server, a subset of users among the members of the audience of the event;

transmitting, from the database server, an invitation to the selected subset of users;

if a user receives the invitation, classifying the user as a member user who is authorized to submit feedback data used to provide a rating for the event;

if a user does not receive the invitation, classifying the user as a nonmember user;

receiving, at the database server, feedback data submitted by a member user via an interface provided on a user terminal, the feedback data relating to the event and identifying the member user that submitted the feedback data, wherein the nonmember user is restricted from accessing the feedback data submitted by the member user;

providing the feedback data submitted by the member user to at least one additional member user via at least one additional user terminal;

receiving, at the database server, a rating for the feedback data, wherein the rating of the feedback data is submitted by the at least one additional member user via an interface provided on the at least one additional user terminal, wherein the nonmember user is restricted from submitting a rating for the feedback data submitted by the member user;

determining, at the database server, a member user weighting for the member user, wherein the member user weighting is based on the rating for the feedback data;

determining, at the database server, the rating for the event based on the feedback data submitted by the member user and the member user weighting, wherein feedback data submitted by a nonmember user is ignored when determining the rating for the event;

determining, at the database server, a ranking for the event as compared to a ranking of at least one other event, wherein the ranking for the event is based on the rating of the event as compared to a rating for the at least one other event; and allowing, at the database server, the nonmember user to access the ranking for the event and the ranking for the at least one other event through a front end interface of the database server.

2. The method as claimed in claim 1, wherein the member user belongs to at least one sub-group of member users.

3. The method as claimed in claim 1, wherein determining the rating for the event is based on a plurality of feedback data and a plurality of respective member user weightings from a plurality of member users.

4. The method as claimed in claim 1, wherein the feedback data is submitted by the user while the user is viewing, listening to or participating in the event.

5. The method as claimed in claim 1, wherein an indication of a plurality of ratings from a plurality of users is provided to a broadcaster of the event.

6. The method as claimed in claim 5, wherein the event is altered during progress in response to the indication of a plurality of ratings.

7. The method as claimed in claim 5, wherein the indication of a plurality of ratings is a 'satisfaction rating' of at least part of the audience of the event.

8. The method as claimed in claim 1, wherein a selection of events are ranked according to the rating of each of the selected events.

9. The method as claimed in claim 1, wherein the member user weighting is obtained by one or more other member users rating previous feedback data of the member user.

10. The method as claimed in claim 1, wherein the member user weighting is altered based on one or more other member users rating the feedback data of the member user.

11. The method as claimed in claim 1, wherein the member user weighting is a default weighting.

12. The method as claimed in claim 1, wherein a broadcaster can access at least part of a database storing the rating.

13. The method as claimed in claim 1, wherein the feedback data is queued on the user terminal and submitted after the event is completed.

14. The method as claimed in claim 1, wherein the event is one of the group of a broadcast, concert, exhibition, tour, show, movie, competition, party, and function.

15. A system for providing a rating for an event, the rating obtained from one or more member users, a member user submitting feedback data using an interface provided on a user terminal, the feedback data relating to the event, the system including:

a processor configured to:

select a subset of users among members of an audience of the event;

transmit an invitation to the selected subset of users;

if a user receives the invitation, classify the user as a member user who is authorized to submit feedback data used to provide a rating for the event;

if a user does not receive the invitation, classify the user as a nonmember user;

receive feedback data submitted by the member user via an interface provided on the user terminal, the feedback data relating to the event and identifying the member user that submitted the feedback data, wherein the nonmember user is restricted from accessing the feedback data submitted by the member user;

provide the feedback data submitted by the member user to at least one additional member user via at least one additional user terminal;

receive a rating for the feedback data, wherein the rating of the feedback data is submitted by the at least one additional member user via an interface provided on the at least one additional user terminal, wherein the nonmember user is restricted from submitting a rating for the feedback data submitted by the member user;

determine a member user weighting for the member user, wherein the member user weighting is based on the rating for the feedback data;

determine the rating for the event based on the feedback data submitted by the member user and the member user weighting, wherein feedback data submitted by a nonmember user is ignored when determining the rating for the event;

determine a ranking for the event as compared to a ranking of at least one other event, wherein the ranking for the event is based on the rating of the event as compared to a rating for the at least one other event;

allow the nonmember user to access the ranking for the event and the ranking for the at least one other event through a front end interface of a database; and the database to store the ratings.

16. The system as claimed in claim 15, wherein the user terminal is a mobile or cellular telephone, or a portable or handheld computing device with network connectivity.

17. The system as claimed in claim 15, wherein the member user weighting is obtained by one or more other member users rating previous feedback data of the member user.

18. A computer program product, executable on a processing system, for use in providing a rating for an event, the computer program product comprising a non-transitory computer readable medium having instructions thereon, the instructions comprising:

code programmed to select a subset of users among members of an audience of the event;

code programmed to transmit an invitation to the selected subset of users;

if a user receives the invitation, code programmed to classify the user as a member user who is authorized to submit feedback data used to provide a rating for the event;

if a user does not receive the invitation, code programmed to classify the user as a nonmember user;

code programmed to obtain the rating from one or more member users;

code programmed to provide an interface configured to enable a member user to submit feedback data from a member user terminal, wherein the feedback data relates to the event and identifies the member user that submitted the feedback data, and wherein the member user has a member user weighting, wherein the nonmember user is restricted from accessing the feedback data submitted by the member user;

code programmed to provide the feedback data submitted by the member user to at least one additional member user via at least one additional member user terminal;

code programmed to receive a rating for the feedback data, wherein the rating of the feedback data is submitted by the at least one additional member user via an interface provided on the at least one additional member user terminal, wherein the nonmember user is restricted from submitting a rating for the feedback data submitted by the member user;

code programmed to determine the member user weighting for the member user, wherein the member user weighting is based on the rating for the feedback data;

code programmed to determine the rating for the event based on the feedback data submitted by the member user and the member user weighting, wherein feedback data submitted by a nonmember user is ignored when determining the rating for the event;

code programmed to determine a ranking for the event as compared to a ranking of at least one other event, wherein the ranking for the event is based on the rating of the event as compared to a rating for the at least one other event;

code programmed to allow the nonmember user to access the ranking for the event and the ranking for the at least one other event through a front end interface of a database.

* * * * *